(12) United States Patent
Larsen (10) Patent No.: US 9,550,645 B2
(45) Date of Patent: Jan. 24, 2017

(54) MANUFACTURING SYSTEM FOR PROCESSING A WEB

(71) Applicant: Coloplast A/S, Humlebaek (DK)

(72) Inventor: Poul Henrik Larsen, Thisted (DK)

(73) Assignee: Coloplast A/S, Humlebaek (DK)

( * ) Notice: Subject to any disclaimer, the term of this patent is extended or adjusted under 35 U.S.C. 154(b) by 23 days.

(21) Appl. No.: 14/415,877

(22) PCT Filed: Jul. 5, 2013

(86) PCT No.: PCT/DK2013/050225
§ 371 (c)(1),
(2) Date: Jan. 20, 2015

(87) PCT Pub. No.: WO2014/012550
PCT Pub. Date: Jan. 23, 2014

(65) Prior Publication Data
US 2015/0175373 A1    Jun. 25, 2015

(30) Foreign Application Priority Data

Jul. 20, 2012   (DK) .................................. 2012 00466

(51) Int. Cl.
*B65H 20/16*     (2006.01)
*B65G 17/32*     (2006.01)

(52) U.S. Cl.
CPC ............. *B65H 20/16* (2013.01); *B65G 17/323* (2013.01); *B65H 2404/315* (2013.01); *B65H 2404/36* (2013.01); *B65H 2408/21* (2013.01); *B65H 2513/106* (2013.01)

(58) Field of Classification Search
CPC ................... B65H 20/16; B65H 20/18; B65H 2301/44338; B65H 2301/44712; B65H 2301/4473; B65H 2402/511; B65H 2404/2613; B65H 2404/30; B65H 2404/31; B65H 2404/33; B65H 2404/34; B65H 2404/341; B65H 2404/342; B65H 2404/3421; B65H 2404/315; B65H 2404/323; B65H 2405/551; B65G 17/066; B65G 17/086; B65G 17/068; B65G 17/06; B65G 17/065; B65G 17/12
(Continued)

(56) References Cited

U.S. PATENT DOCUMENTS

|   |   |   |
|---|---|---|
| 969,295 A | 9/1910 | Meahl |
| 1,769,546 A | 7/1930 | Ritchey |
| 1,837,605 A | 12/1931 | Baker |

(Continued)

FOREIGN PATENT DOCUMENTS

| DE | 354656 | 6/1922 |
|---|---|---|
| EP | 0302524 A2 | 2/1989 |
| EP | 1977983 A1 | 10/2008 |

*Primary Examiner* — Michael McCullough
(74) *Attorney, Agent, or Firm* — Coloplast Corp., Coloplast A/S; Nick Baumann (57) ABSTRACT

The invention provides a manufacturing system for processing a web, the system comprising a rigid frame with a plurality of processing stations; an endless belt which is movable relative to the frame; a track for guiding the endless belt between the processing stations; and a drive structure for advancing the belt along the track, To enable more flexible processing time at each processing station and to make better use of the space along the track, the system facilitates movement of a web at different speed at different locations along the track.

12 Claims, 4 Drawing Sheets

(58) Field of Classification Search
USPC .............................. 226/173; 198/460.2, 812
See application file for complete search history.

(56) References Cited

U.S. PATENT DOCUMENTS

| | | | |
|---|---|---|---|
| 2,288,571 A | | 6/1942 | Pointon |
| 2,487,354 A | | 11/1949 | McNamara |
| 2,534,054 A | | 12/1950 | Parkes |
| 2,551,080 A | | 5/1951 | Allen et al. |
| 4,284,191 A | * | 8/1981 | Lavau ..................... B66B 21/12 198/334 |
| 4,526,271 A | | 7/1985 | Finnighan |
| 4,601,421 A | * | 7/1986 | Natterer ................. B65H 20/16 198/626.1 |
| 5,259,912 A | | 11/1993 | Cline |
| 5,271,489 A | | 12/1993 | Helmstetter |
| 5,680,746 A | | 10/1997 | Hornisch |
| 5,785,312 A | | 7/1998 | Krupica et al. |
| 6,543,767 B1 | | 4/2003 | Krouse |
| 2001/0013459 A1 | | 8/2001 | Pattantyus-Abraham et al. |
| 2006/0219610 A1 | | 10/2006 | Varney et al. |
| 2011/0240440 A1 | | 10/2011 | Philipp |

* cited by examiner

MANUFACTURING SYSTEM FOR PROCESSING A WEB

The present invention relates to a manufacturing system for processing a web. Particularly, the invention pertains to a system comprising a rigid frame with a plurality of processing stations; an endless belt which is movable relative to the frame; a track for guiding the endless belt between the processing stations; and a drive structure for advancing the belt along the track.

The invention further relates to a chain link for the system and to a method of processing a web by use of the system.

BACKGROUND OF THE INVENTION

A production line is a set of sequential operations established in a factory whereby materials are advanced through processing stations providing a refining process to produce an end-product.

Automated production lines exist where workers and/or fully automated production equipment, e.g. including robots, are arranged along a conveyer which brings material forward. Traditionally, the conveyer is moved regularly or continuously, in such a manner that the processing time of each sequential operation is taken into account.

Particularly, with respect to processing of a web, it is typically required to synchronize movement of the conveyer with operation time at each processing station, and it is typically challenging to optimise all processing stations for equal processing time and to avoid tension in the web.

A difference in operation time will typically lead to idling of processing stations of the less time consuming processes since the movement of the conveyor is adapted to allow the most time consuming process to finalize.

To balance differences in operation time, several processing stations may jointly accomplish the most time consuming processes. In case of malfunction in one of the processing stations, bottlenecks may, however, develop, and it is typically difficult, if not impossible, to completely balance the differences between the processes. As a result, very long conveyors are sometimes applied to provide sufficient space of identical processing stations and for establishing sufficient material to avoid tension in the web etc.

U.S. Pat. No. 1,769,546 discloses a conveyer system where the speed can be changed along the conveyer, and the belt comprises two parallel endless chains made of links. Between each chain, a work-supporting bar carries a rubber belt. A cam-plate causes cross-rods to move apart whereby the material will be stretched. The stretching is possible due to friction with the material.

U.S. Pat. No. 2,487,354 discloses a plurality of article supporting members in the form of circular cup like members which are connected to and moved by a chain made from a plurality of chain links. The guide-way comprises a narrow single file portion and a wider double file portion. In the wider portion, the chain and the article supports will be shifted into a zig-zag relationship until they assume the double file relationship. The sprocket wheel which drives the chain may thus drive at a constant speed while the supporting members are moved forward along the guide-way at full speed in the single file portion and at near half-speed in the double file portion.

There remains a need for a device which is capable of conveying or processing long webs, e.g. of a fragile material.

SUMMARY OF THE INVENTION

It is an object of embodiments of the invention to improve existing manufacturing systems and particularly to enable better usage of processing stations in a row of different processing stations, to improve conveying and processing of web-formed material, and to reduce the risk of tension developing in the web during conveying or processing.

In a first aspect, the invention provides a manufacturing system facilitating movement of the web at different speed at different locations along the track.

Accordingly, a difference in operation time may be counteracted by the different speed by which the web is moved, and the above-mentioned drawbacks can be reduced or avoided.

The belt comprises, or is constituted by, chain links joined to a forward and a rearward adjacent chain link by hinge structures. To enable pivoting of one chain link relative to adjacent chain links, each hinge structure comprises a chain rivet with a centre axis about which two adjacent chain links are rotatable relative to each other, i.e. about which one chain link can pivot relative to an adjacent chain link. Each chain link comprises a gripping structure facilitating stretching of the web between two adjacent chain rivets.

The device thereby enables an essentially plane web between each of the hinge structures. By that structure, the web can be advanced in the form of a plurality of essentially plane web segments stretched by the gripping structures of each link, and the plane web segments are joined by bendable web segments between two adjacent chain links.

Herein the term "web" encompasses thin-walled material of any kind, e.g. a film or foil material, e.g. of thermoplastic material or sheet metal material. Typically the web would be made in a continuous manner thereby forming a very long length of the material, e.g. rolled up. The term web, herein also encompasses materials which are not necessarily woven, fibrous or threaded. A continuous sheet of a film having a completely closed structure e.g. of PVC, PP, or aluminium etc. would also be considered to be within the term "web".

Herein the term "rivet" encompasses any kind of pin or element forming pivot between two adjacent chain links, i.e. including bolts, rods and traditional rivets such as blind rivets etc.

The web may particularly be processed into a row of articles made from layers of a sheet material. Examples of such articles are bags, bandages, laminated foil or film products etc.

The web may e.g. be utilised for carrying a row of such thin articles along the track, or the web may form part of articles being made in a long row by subsequent application of different processes along the track. The articles may thus be made from, or they may form part of, one and the same web. They could e.g. all include the same base material web and be separated from each other at a final separation process.

Accordingly, the system may include a main gate for entering the web into the system and a main exit for removing the web or articles made from the web. The system may include a number of additional gates and additional exits for entering and removing additional elements, e.g. additional sheets of material to be bonded to the web.

The track may be formed by any suitable means for guiding the belt, e.g. by elongated profiles having a shape whereby it may guide the belt along a path which extends from processing station to processing station. The profiles could e.g. be C-profiles or other profiles forming a track for a belt. The track could also be formed by the chain links themselves, e.g. when the belt is stretched between sprocket wheels or rolls of some kind.

Herein, the term endless belt means that the belt forms a closed loop.

The gripping structure may comprise at least two clamps for each chain link. One of the clamps may be located relatively close to one of the hinge structures and the other clamp structure may be relatively close to the other one of the hinge structures.

Each clamp may comprise a pair of jaws being arranged on opposite sides of a plane which is stretched by the centre axis of a first and a second chain rivet. With this structure, the web can be carried by the clamps in height with the centre axes of the chain rivets. Since the web is carried in height with the centre axes of the rivets, the chain links may fold relative to each other without stretching or compressing the web.

The track may include at least one buffer zone between adjacent processing stations along the track. The buffer zone allows temporary storage of the belt and web. Particularly, the buffer zone may facilitate folding of the belt between each of the chain links. In a concertina folded configuration, a relatively long portion of the belt can be stored without taking up very much space along the track, and since the web is carried in height with the centre axes of the chain rivets, the folding does not introduce stress in the web.

To facilitate buffering, the track may comprise transport sections and buffer sections, the transport sections holding the belt in a stretched-out configuration where each chain link coextends a previous chain link along the path between the processing stations, and the buffer section allowing the belt to fold and thereby allowing each chain link to extend in a direction opposite the direction of the adjacent chain links.

The transport section may be constituted by a profile which guides the belt strictly in a specified path, i.e. the belt is locked completely to a specified path. The buffer section may e.g. be constituted by a profile which allows the belt to depart from the specified path. The profile may e.g. form an opening allowing the belt to sink, under influence of gravity, into a low-lying area, and as each chain link sinks down into that area, the belt may be buffered by folding of the belt between the chain links.

The drive structure may comprise a plurality of individually controllable power driven drives fixed to the frame between different processing stations. The power driven drives may cooperate with a drivable structure which is fixed to, or forms part of the belt and which thereby moves the belt relative to the frame.

Particularly, the power driven drives and the drivable structure of the belt may be two separate and non-joined elements. The power driven drives may engage the drivable structure momentarily as the drivable structure passes the power driven drive. In that way, only a part of the belt having a drivable structure being directly adjacent to a power driven drive is influenced by force from the drive.

The power driven structure may e.g. be a wheel, e.g. provided with a friction increasing rubber surface and capable of engaging or leaning against a surface of the belt to advance the belt when rotating. The power driven structure may alternatively or additionally be a tooth or sprocket wheel or a toothed endless belt rotated by a drive structure, and the drivable structure may be a corresponding tooth rack or similar element which is engagable by a tooth wheel, e.g. a toothed endless belt.

In operation, the power driven drives may move a portion of the belt, e.g. a few chain links passed a processing station whenever the processing station is ready to process the web. These few chain links may e.g. be pulled out of a buffer zone which is located before the processing station along the track. In one embodiment, the system therefore comprises at least one buffer zone for each processing station.

The drivable structure may e.g. comprise a driven element attached to a plurality of the chain links or to each chain link. The belt thereby becomes section-wise drivable such that individual chain links can be moved past a processing station without necessarily moving the entire belt.

The system may particularly comprise at least one power driven drive between each of the processing stations along the track, and/or at least one driven element for each chain link.

The power driven drive is typically actively powered by electricity, hydraulics, pneumatics, or by a similar power source, whereas the driven element is passively driven forward by the power driven drive. In an alternative embodiment, the power driven drive which is fixed to the frame is passive, and the driven element which is attached to the belt is actively powered by electricity, hydraulics, pneumatics, or any similar source of power. In yet another alternative embodiment, both the power driven drives and the driven element are actively powered.

In one embodiment, the driven element may include a projection being movable, e.g. by use of an electrically powered solenoid etc. between a raised position where the projection is not within reach of the power driven drives and a lowered position where the projection is reachable by the power driven drives whereby the power driven drives can bring forward the belt by pushing the projection forward.

The system may further comprise a control structure by which each power driven drive is individually controllable, the control structure being adapted to control each power driven drive individually based on available buffer space and processing time for each processing station. For this purpose, the control structure may communicate with each of the processing stations and operate the power driven drives individually based on status for the processing of the material and the processing stations. When a processing station has finished processing, a ready-signal may be sent to the control structure which then operates a corresponding power driven structure to move material forward to the processing station which is ready. The control structure may further communicate with sensors located along the track, e.g. sensors which are capable of determining free space in the buffer zones, determining tension in the belt, and similar states which may form basis for deciding when to move the belt or parts of the belt.

In one embodiment, the control structure is distributed to each of the power driven drives and/or to each of the driven elements. In this embodiment, the processing station may communicate directly with a power driven drive or with a driven element whenever material is needed.

In a second aspect, the invention provides a chain link for a system according to the first aspect of the invention. Particularly, to a chain link which is joined to adjacent links by hinge structures. The hinge structures and chain links thereby form a belt which can fold between each chain link.

The hinge structures may comprise a chain rivet with a centre axis about which two adjacent chain links are rotatable relative to each other, and a gripping structure may facilitate stretching of the web between two adjacent chain rivets.

Particularly, the gripping structure may facilitate stretching of the web in a plane which intersects the centre axis of two adjacent chain rivets, and the gripping structure may comprise a pair of jaws being arranged on opposite sides of a plane which is stretched by the centre axis of the chain rivets of the chain link. Any of the features described for the belt and chain link of the system according to the first aspect, may apply equally to the chain link of the second aspect of the invention In a third aspect, the invention provides a method for making articles which are interconnected in a lengthwise direction and thereby forms a long, potentially uniform, web, the method comprising the steps of conveying the web by use of a system according to the first aspect of the invention, particularly in the lengthwise direction past a plurality of processing stations, where the web is conveyed at a conveying speed or frequency which is changed between at least two of the stations.

Herein frequency means, how often movement is initiated in stepwise conveying, and speed is the speed by which the items are conveyed—including continuous conveying.

The method may include any step in accordance with the features of the system of the first aspect of the invention, and particularly, it may include the step of buffering the belt and the web between the stations depending on processing speed or capacity at each station. It may also include the step of communicating a need for material from the processing stations to drives which operate on belt.

DETAILED DESCRIPTION

In the following, embodiments of the invention will be described by way of example with reference to the figures in which.

Further scope of applicability of the present invention will become apparent from the following detailed description and specific examples. However, it should be understood that the detailed description and specific examples, while indicating preferred embodiments of the invention, are given by way of illustration only, since various changes and modifications within the scope of the invention will become apparent to those skilled in the art from this detailed description.

Figure 1:
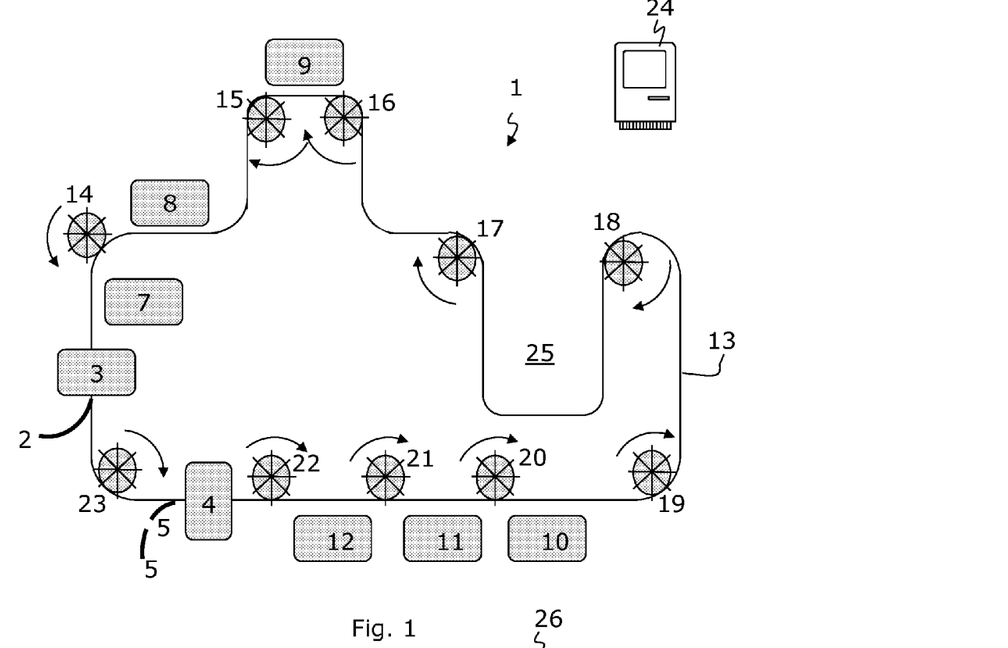
FIG. 1 illustrates schematically, a system according to the invention.
Figure 2:
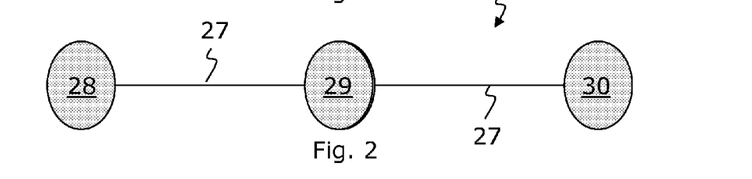
FIG. 2 illustrates schematically, two chain links joined by a chain rivet.

FIGS. 1 and 2 illustrate a manufacturing system 1 according to the invention. The system is designed for processing a web 2 which enters the gate 3 and which is rejected from the exit 4 in the shape of a row of articles 5 which constitute pieces of the web 2 after they are cut off from the web. The articles could be bags, e.g. medical bags such as colostomy bags.

Figure 4:
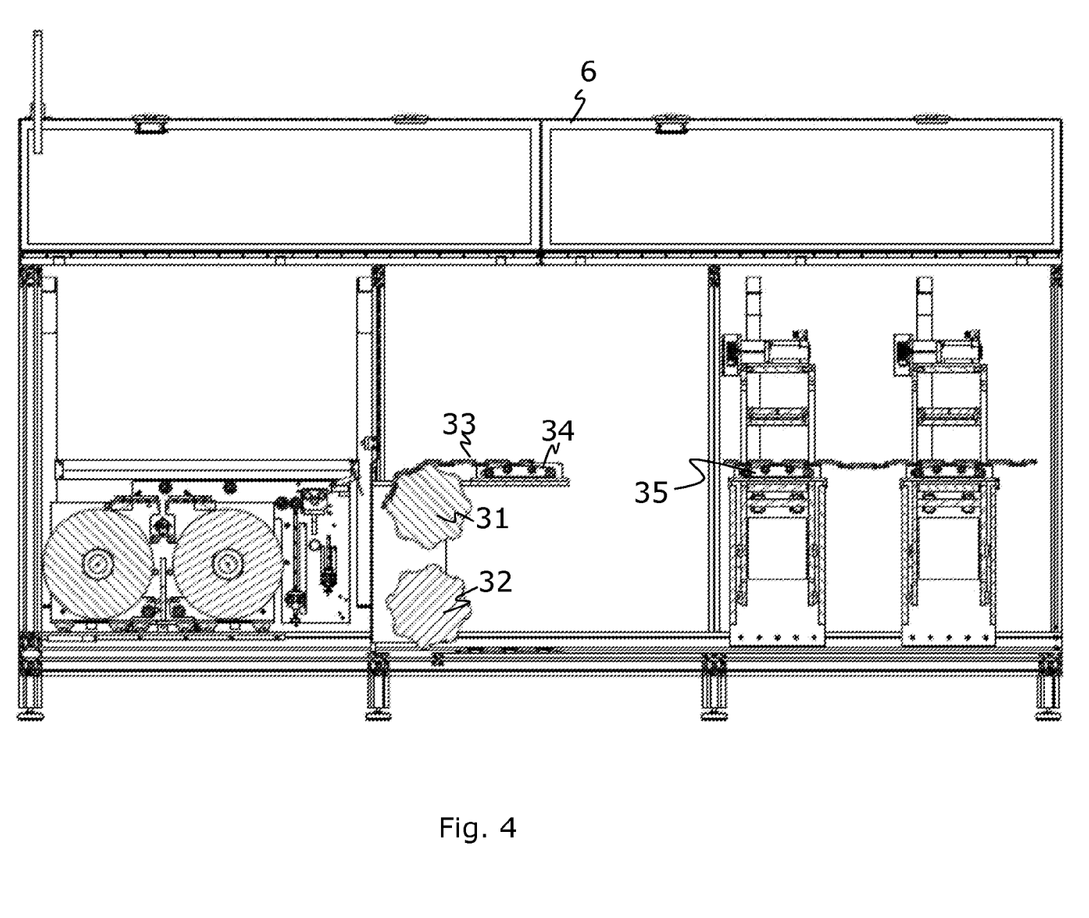
FIG. 4 illustrates the system in further details including the frame.

The system comprises a rigid frame 6 (c.f. FIG. 4) with a plurality of processing stations 7-12 which are arranged along a track 13 (c.f. FIG. 1).

The system further comprises an endless belt which forms a closed loop along the track. The belt is made from chain links which are joined by chain rivets such that each chain link is rotatable relative to an adjacent chain link.

The belt is moved forward by power driven drives 14-23 arranged along the track and fixed to the frame. The power driven drives comprises a tooth wheel which is rotated by a servo motor. The servo motors communicate with a computer 24 which forms a control structure for the system.

The power driven drives 14-23 are individually controllable such that they can run with different speed, or such that some may stand still while others rotate. In that way, parts of the belt may move with one speed while other parts may move with a different speed.

Figure 3:
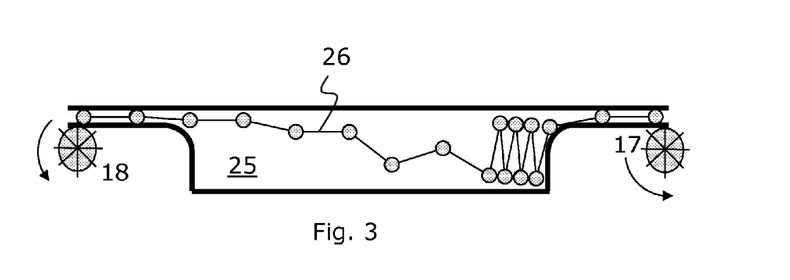
FIG. 3 illustrates schematically a buffer zone with a concertina folded belt.

To enable different speed or complete stand-still of the belt, the system comprises a buffer zone illustrated schematically by the low lying area 25. The belt can sink into this zone by gravity. In FIG. 3 it is illustrated how the buffer zone may function e.g. by stacking the chain links 26 in a concertina folded shape.

The chain links 26 are illustrated in FIG. 2 and shown in further details in FIGS. 6-9. Each chain link comprises a body 27 which is capable of holding the web. The body is joined to a forward and a rearward adjacent chain link by hinge structures comprising a chain rivet 28, 29, 30.

The track comprises transport sections and buffer sections. Along the transport sections, the belt is locked completely to a specified stretched-out configuration and moves between the processing stations. FIG. 3 illustrates a buffer zone where the belt is allowed to depart from the path and sink into a low lying area under influence of gravity. In the illustrated embodiment, the buffer zone includes a suspension structure capable of suspending every second hinge joint between the chain links such that the chain links become folded in a vertical manner. The direction of the belt is from right to left.

To hold the web, the chain link comprises a gripping structure which is shown in further details in FIGS. 6-9. The gripping structure is adapted to hold the web in a stretched-out configuration between the two chain rivets which holds the chain link connected to adjacent chain links. More particularly, such that the web extends between the centre axes about which two adjacent chain links are rotatable relative to each other. In that way, the belt can fold and bend around corners without stretching or compressing the web. Accordingly, the system may include outwards and inwards corners about which the belt is curved, and the belt may fold in the buffer zone without stretching and potentially damaging the web.

FIG. 4 illustrates further details of the system. The transport wheels 31, 32 have relatively large radial size and provide a smooth bending of the belt 33 about corners to change direction of the belt. The power driven drives 34, 35 are fixed to the frame and works on one individual chain link in the belt such that different portions of the belt can move at different speed. In the illustration of FIG. 4, only a few potions of the belt are illustrated, however, the belt forms a closed circuit.

Figure 5:
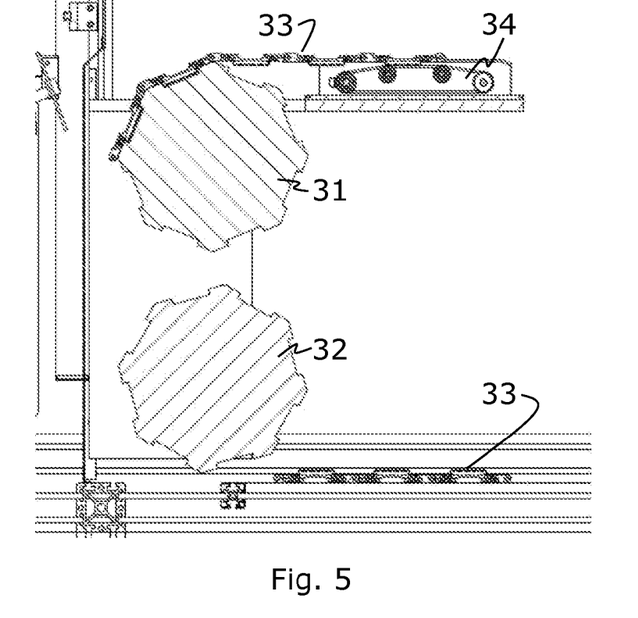
FIG. 5 illustrates an enlarged view of a detail of the system.

FIG. 5 illustrates an enlarged view of the transport wheels 31, 32, the belt 33, and the power driven drive 34.

FIGS. 6-9 illustrate further details of the belt or more particularly of the chain links constituting the belt. Typically, the system would comprise two belts arranged to move along parallel tracks at a distance which is variable. The web is stretched between the belts, and webs of different width can be handled by adjusting the distance between the two belts.

Figure 6:
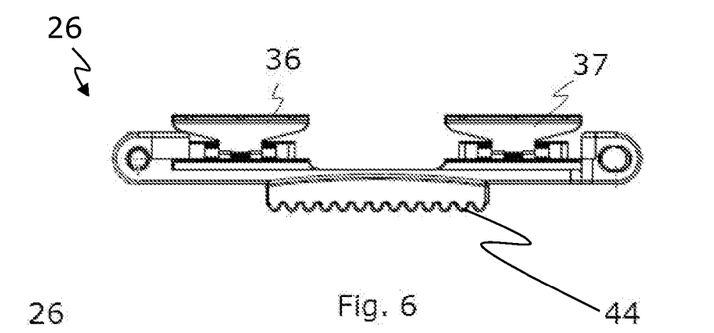
FIGS. 6-9 illustrate different views of a chain link of a belt for a device according to the invention.
Figure 7:
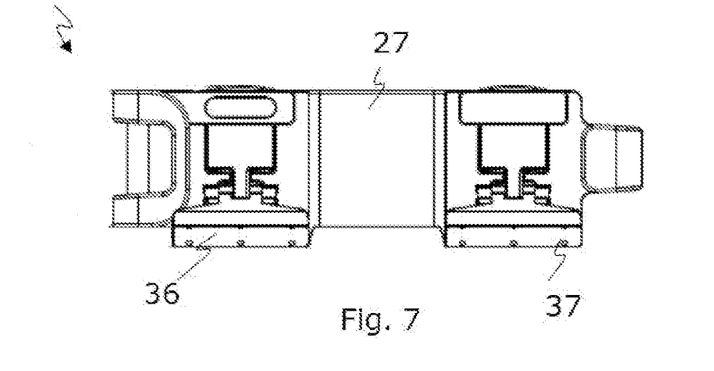

Each chain link 26 comprises a gripping structure with two clamps 36, 37. FIG. 6 illustrates a side view and FIG. 7 illustrates a top view, both views with the clamps 36, 37 being closed.

Figure 8:
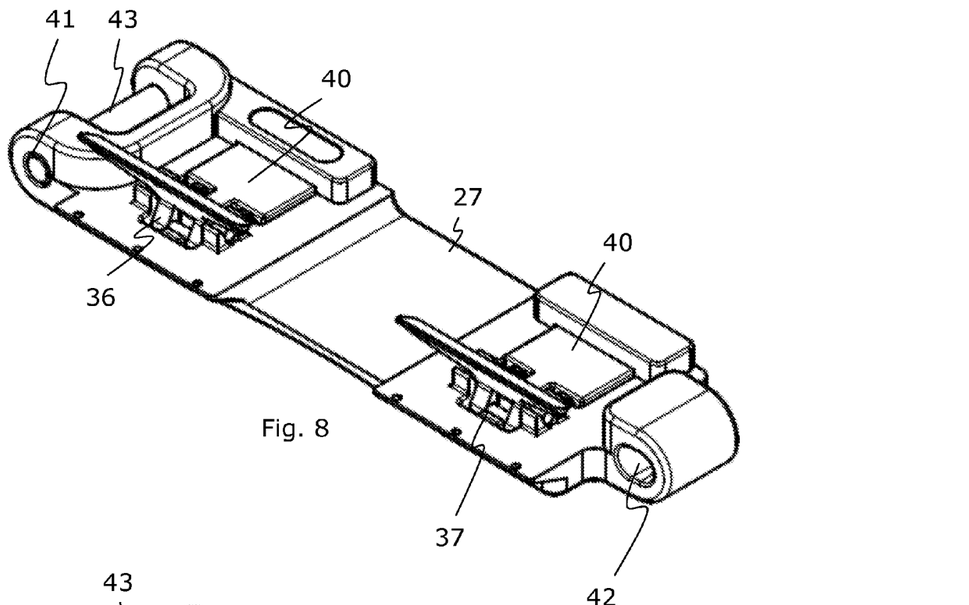
Figure 9:
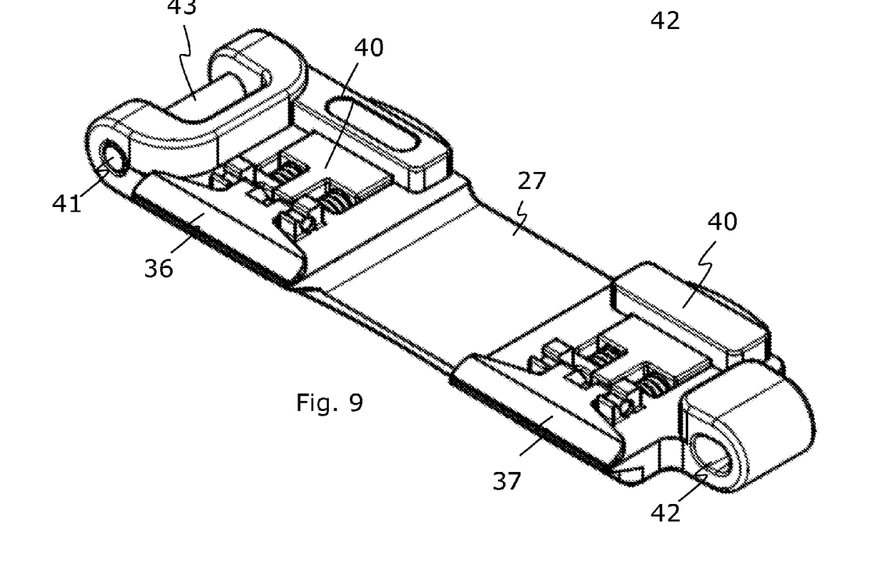

FIG. 8 illustrates a perspective view with the clamps open and FIG. 9 illustrates a perspective view with the clamps closed.

Each clamp comprises a base 38 and a grip 39 which is movable relative to the base between an open configuration in which the clamp is ready to receive a web and a closed configuration where the web is fixed between the base and the grip. In FIGS. 6-9, the clamps are illustrated in the open configuration. The chain link comprises actuation means 40 for moving the clamps between the open and closed configurations. The actuation means may be electrically operated, or they may be triggered as they pass trigger-elements arranged alongside the track.

The base and grip form a pair of jaws being arranged on opposite sides of a plane which is stretched by the centre axis of the two chain rivets which are received in the chain rivet bearings 41, 42 by which the chain link is connected hingely to adjacent chain links. Only one chain rivet 43 is shown.

Each link, or at least some of the links comprises a drivable structure 44 shown in FIG. 6. The drivable structure is may e.g. be constituted by a toothed rack which can cooperate with the power driven drives to provide movement of the belt relative to the frame.

The system may additionally comprise a number of sensors arranged along the track and providing control information about availability of chain links, free buffer space etc. these sensors are not illustrated in the drawings.

The invention comprises particularly the following numbered embodiments:

Embodiment 1: A manufacturing system for processing a web, the system comprising a rigid frame with a plurality of processing stations; an endless belt which is movable relative to the frame; a track for guiding the endless belt between the processing stations; and a drive structure for advancing the belt along the track, where the system facilitates movement of a web at different speed at different locations along the track.

Embodiment 2: A system according to embodiment 1, where the belt comprises chain links, each chain link being joined to a forward and a rearward adjacent chain link by hinge structures, where each hinge structure comprises a chain rivet with a centre axis about which two adjacent chain links are rotatable relative to each other.

Embodiment 3: A system according to embodiment 2, where each chain link comprises a gripping structure facilitating stretching of the web between two adjacent chain rivets.

Embodiment 4: A system according to embodiment 3, where the gripping structure facilitates stretching of the web in a plane which intersects the centre axis of two adjacent chain rivets.

Embodiment 5: A system according to any of embodiments 3-4, where the gripping structure comprises at least two clamps for each chain link, each clamp comprising a pair of jaws being arranged on opposite sides of a plane which is stretched by the centre axis of a first and a second chain rivet where the first chain rivet joins a chain link to a forward adjacent chain link and the second chain rivet joins the same chain link to a rearward adjacent chain link.

Embodiment 6: A system according to any of the preceding embodiments, where the track includes at least one buffer zone between adjacent processing stations along the track, the buffer zone allowing temporary storage of the belt and web.

Embodiment 7: A system according to embodiment 6, where the buffer zone facilitates folding of the belt.

Embodiment 8: A system according to any of embodiments 2-5 and 6-7, where the buffer zone facilitates folding between each of the chain links of that part of the belt being in the buffer zone.

Embodiment 9: A system according to any of embodiments 6-8, where the track comprises a transport sections and buffer sections, the transport sections holding the belt locked to a specified stretched-out configuration where each chain link coextends a previous chain link along a specified path between the processing stations, and the buffer section allowing the belt to depart from the path.

Embodiment 10: A system according to embodiment 9, where the buffer section allows the belt to sink, under influence of gravity, into a low-lying area.

Embodiment 11: A system according to any of the preceding embodiments, where the drive structure comprises a plurality of individually controllable power driven drives fixed to the frame between different processing stations, and where the belt comprises a drivable structure adapted to cooperate with the power driven drives to provide movement of the belt relative to the frame.

Embodiment 12: A system according to any of embodiments 2-10 and 11, where the drivable structure comprises a driven element attached to each chain link and being individually engagable by one of the power driven drives.

Embodiment 13: A system according to any of embodiment 11-12 further comprising a control structure by which each power driven drive is individually controllable, the control structure being adapted to control each power driven drive individually based on available buffer space and processing time for each processing station.

Embodiment 14: A chain link for a system according to any of embodiments 1-13, the chain link comprising a gripping structure facilitating stretching of the web between two adjacent chain rivets.

Embodiment 15: A chain link according to embodiment 14, where the gripping structure facilitates stretching of the web in a plane which intersects the centre axis of two adjacent chain rivets.

Embodiment 16: A chain link according to any of embodiments 14-15, where the gripping structure comprises at least two clamps for each chain link, each clamp comprising a pair of jaws being arranged on opposite sides of a plane which is stretched by the centre axis of a first and a second chain rivet where the first chain rivet joins a chain link to a forward adjacent chain link and the second chain rivet joins the same chain link to a rearward adjacent chain link.

Embodiment 17: A method for manufacturing a web by use of a system according to any of embodiments 1-13, the method comprising the steps of using the belt to convey the web in the lengthwise direction past a plurality of processing stations, where the web is conveyed at a conveying speed or frequency which is changed between at least two of the stations.

Embodiment 18: A method according to embodiment 17, where web is buffered between the stations depending on processing speed or capacity at each station.

What the invention claim is:

1. A manufacturing system for processing a web, the system comprising a rigid frame with a plurality of processing stations; an endless belt which is movable relative to the frame; a track for guiding the endless belt between the processing stations; and a drive structure for advancing the belt along the track, where the system facilitates movement of the web at a first speed at a first location of the track and a second speed that is different from the first speed at a second location of the track that is different from the first location of the track, the belt comprising chain links, each chain link joined to a forward and a rearward adjacent chain link by hinge structures, where each hinge structure comprises a chain rivet with a centre axis about which two adjacent chain links are rotatable relative to each other;

characterized in that each chain link comprises a gripping structure facilitating stretching of the web between two adjacent chain rivets;

wherein the drive structure comprises a plurality of the individually controllable power driven drives fixed to the frame between different processing stations, and where the belt comprises a drivable structure adapted to cooperate with the power driven drives to provide movement of the belt relative to the frame.

2. A system according to claim 1, where the gripping structure facilitates stretching of the web in a plane which intersects the centre axis of two adjacent chain rivets.

3. A system according to claim 1, where the gripping structure comprises at least two clamps for each chain link, each clamp comprising a pair of jaws being arranged on opposite sides of a first chain rivet of a first hinge structure and a second chain rivet of a second hinge structure, where the first chain rivet joins a chain link to a forward adjacent chain rivet and the second chain rivet joins the same chain link to rearward adjacent chain link.

4. A system according to claim 1, where the track includes at least one buffer zone between adjacent processing stations along the track, the buffer zone allowing temporary storage of the belt and web.

5. A system according to claim 4, where the buffer zone facilitates folding of the belt.

6. A system according to claim 5, where the buffer zone facilitates folding between each of the chain links of that part of the belt being in the buffer zone.

7. A system according to claim 4, where the track comprises transport sections and buffer sections, the transport sections holding the belt in a stretched-out configuration where each chain link coextends a previous chain link along a specified path between the processing stations, and the buffer sections allowing the belt to depart from the path.

8. A system according to claim 7, where the buffer sections allow the belt to sink, under influence of gravity, into a low-lying area.

9. A system according to claim 1, where the drivable structure comprises a driven element attached to each chain link and being individually engagable by one of the power driven drives.

10. A system according to claim 1 further comprising a control structure by which each power driven drive is individually controllable, the control structure being adapted to control each power driven drive individually based on available buffer space and processing time for each processing station.

11. A manufacturing system for processing a web, the system comprising:

a frame with a plurality of processing stations;

a belt movable relative to the frame;

a track for guiding the belt between the processing stations; and a drive structure for advancing the belt along the track, where the drive structure comprises a plurality of individually controllable power driven drives each fixed to the frame between two of the processing stations;

wherein the system facilitates movement of the web at a first speed at a first location of the track and a second speed that is different from the first speed at a second location of the track that is different from the first location of the track;

wherein the belt comprising chain links, each chain link joined to a forward chain link and a rearward chain link by hinge structures, where each hinge structure comprises a chain rivet and an axis about which two adjacent chain links are rotatable relative to each other;

wherein each chain link comprises a gripping structure facilitating stretching of the web between two adjacent chain rivets.

12. The system of claim 11, wherein the belt comprises a drivable structure adapted to cooperate with the power driven drives to provide movement of the belt relative to the frame.

* * * * *